Aug. 16, 1949.  C. W. STEWARD  2,479,087
MULTIARC ELECTRIC WELDING CIRCUIT
Filed Oct. 29, 1948

INVENTOR.
COLBY WESTON STEWARD
BY Robert V. Morse
  Attorney

Patented Aug. 16, 1949

2,479,087

UNITED STATES PATENT OFFICE 2,479,087

MULTIARC ELECTRIC WELDING CIRCUIT

Colby Weston Steward, Newton, Iowa, assignor, by mesne assignments, to Cornell Aeronautical Laboratory, Inc., a corporation of New York Application October 29, 1948, Serial No. 57,400

3 Claims. (Cl. 315—165)

This invention relates to arc welding, and while it is of general application it is particularly advantageous in butt welding of thin sheet metal, including aluminum and aluminum alloys. It lies in the field of the so-called "multi-arc" welding as described for example in Patent No. 2,437,840, Method of multi-arc welding, issued March 16, 1948, to Colby Weston Steward and Malcolm R. Rivenburgh. The multi-arc method has consisted in general of a combination of carbon electrodes and a metallic electrode, in which the carbon electrodes operate on an A. C. circuit to preheat the work and provide a suitable atmosphere for the D. C. metallic electrode which supplies the metal for the actual welding. Various effective circuits are shown in the Patent No. 2,437,840 above mentioned, and the present invention consists in a further improved circuit which gives somewhat better control and more balanced relation of the arcs between the metallic electrode and the carbons, as well as control of the amplitude of the arc from the metallic electrode to the work. The result is to make it somewhat easier to develop good workmanship in this field.

This new circuit may take various forms as will be apparent to those skilled in the art from some of the examples herein shown; but briefly this invention may be said to be characterized by the fact that the D. C. and the work piece are connected to a center tap in the secondary of the A. C. transformer in order to obtain a better balanced relation in the carbon circuit, together with an improved control in the D. C. welding circuit. This new circuit gives a total of six arcs in action as will be described.

Referring now to the drawings forming part of this specification,

Fig. 1 is a diagrammatic view of one preferred form of the invention, simplified for clarity, showing the center tap A. C. and D. C. connection and welding electrode control.

Similar reference numerals refer to similar parts thruout the various views.

Figure 1:
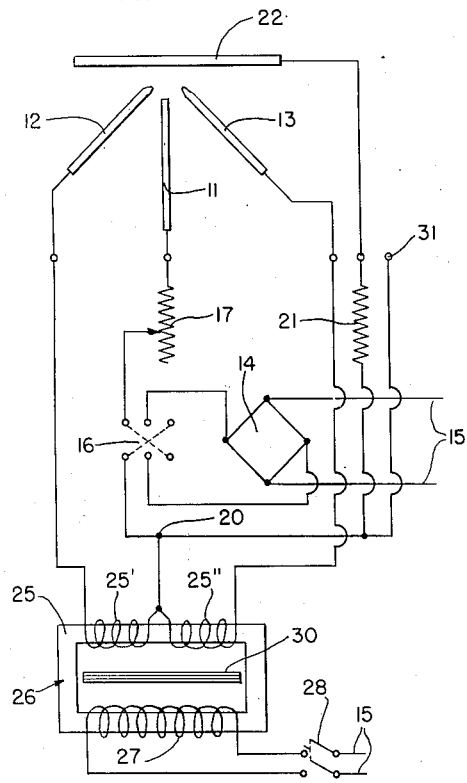

Referring now to Fig. 1, a flux-coated metallic electrode 11 is shown between two carbon electrodes 12 and 13. The carbon electrodes are supplied with alternating current to provide an A. C. arc as a suitable environment in which the direct current metallic electrode 11 may do the actual welding. The metallic electrode 11 is supplied with direct current by any suitable means such as the rectifier 14 connected to the A. C. supply 15. One direct current side of the rectifier 14 is connected thru the reversing switch 16 and regulatory resistance 17 to the metallic welding rod 11; while the other D. C. side of the rectifier 14 is connected thru the switch 16 to the center tap connection 20 and from there thru the resistance 21 to the work piece 22.

In order to tie the A. C. and D. C. circuits together and to provide the multiplicity of arcs to be hereinafter described, the tap 20 is connected to a point at or near the center of the secondary 25 of the A. C. transformer 26, such a connection being termed a center-tap. This in effect divides the secondary 25 in two, with one part 25' being connected to the carbon electrode 12 and the other part 25" being connected to the carbon electrode 13. The transformer 26 of course has also a primary 27 connected to the A. C. supply 15 thru the switch 28. For convenient adjustment or control of the secondary current, the transformer 26 may be provided with an adjustable magnetic shunt 30 if desired.

An extra terminal 31 is provided in the D. C. circuit for use as a ground connection when doing ordinary D. C. arc welding without the multi-arc feature. But of course the principal purpose of the invention is to provide improved A. C.- D. C. multi-arc welding as will be described.

When the apparatus is used for multi-arc welding the A. C. circuit is first closed and an arc is formed between the two carbon electrodes 12 and 13. This A. C. twin-carbon torch 12—13 is then brought close to the workpiece 22 so as to preheat it and provide a favorable atmosphere for the metallic welding electrode 11. The direct current circuit is then closed thru the metallic welding electrode 11; and as its arc is brought to the workpiece 22 the welding is then carried on using the metallic electrode 11 as the welding rod. This welding with the D. C. electrode 11 is done in the atmosphere provided by the arcs of the A. C. carbon electrodes which not only serve to shield the weld from the air but also provide such a conductive atmosphere that the D. C. metallic electrode can be worked at a lower D. C. voltage than in ordinary D. C. welding, tending to give less porosity at the weld and greater strength. Because of this, butt welds of very thin sheets are made possible.

Under the present improvement there is a more balanced relation of the arcs between the metallic electrode and the carbons, and a total of six arcs are provided, viz: from the carbon 12 to the carbon 13, fed by A. C.; from the metallic electrode 11 to the carbon electrode 12, fed by A. C. and by D. C.; from the metallic electrode 11 to the carbon electrode 13, fed by A. C. and by D. C.; from the carbon electrode 12 to the work 22, fed by A. C.; from the carbon electrode 13 to the work 22, fed by A. C.; and from the metallic electrode (welding rod) 11 to the work 22, fed by D. C. These arcs are known to be present from a consideration of the circuit, and they may be observed thru the medium of high-speed photography. This arrangement secures a confined and easily controlled heating effect.

Figure 2:
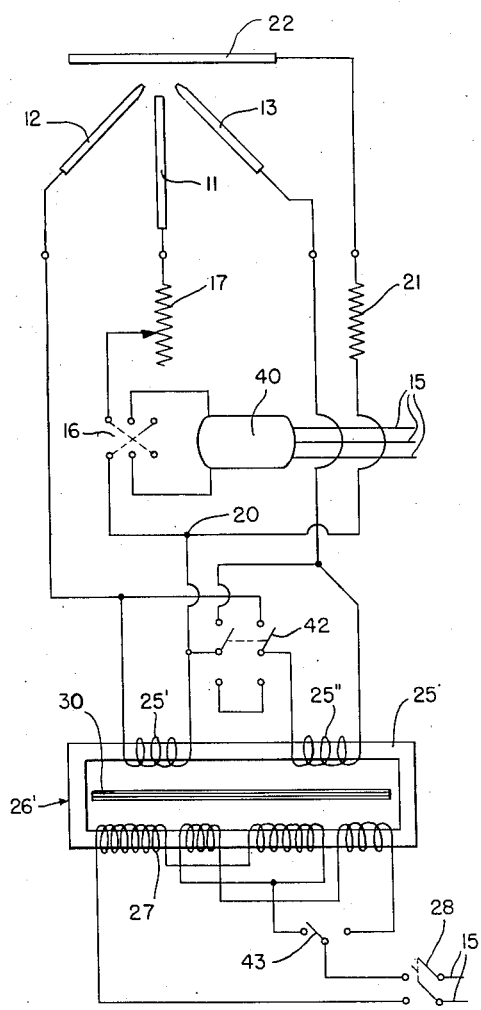
Fig. 2 is a more elaborate diagram embodying somewhat similar principles.

The general principles will be evident from the foregoing. The modification shown in Fig. 2 is a more elaborate form preferred in practice, operating on similar general principles but having high-low voltage controls in the A. C. circuit, and if desired a motor-generator in the D. C. circuit instead of the rectifier 14. Such motor-generators 40 or rotary convertors are also used in ordinary D. C. welding, but under the present invention the D. C. load can be somewhat reduced.

The particular source of supply for the direct current is of course immaterial, as any of the well known means for furnishing direct current may be used. When only A. C. is available, rectifiers, convertors, motor-generators, batteries, or D. C. dynamos may be required, though of course in plants wired for both A. C. and D. C. no such additional elements will be needed. It is however important on the A. C. side that an intermediate tap be used in connection with the transformer so as to provide the desired A. C. circuits as described.

In Fig. 2 the part of the A. C. high-low switch on the secondary side of the transformer 26' is shown at 42 and another part of the A. C. high-low switch, on the primary side of the transformer 26', is shown at 43. While these switches 42 and 43 may be separate, it is generally desirable in practice to mount them together on a panel board so that they can be operated simultaneously or separately. Switch 43 gives two primary voltages and switch 42 gives two secondary voltages, so that in combination various voltages may be obtained.

Figure 3:
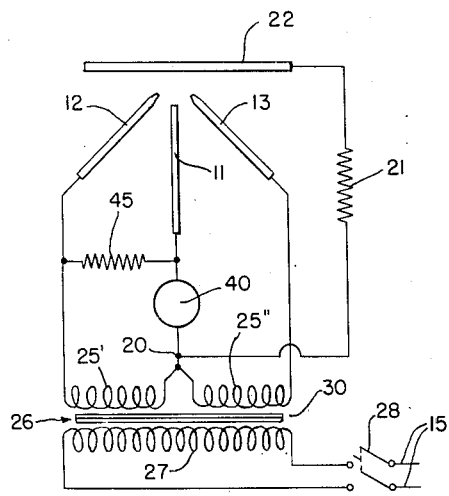
Fig. 3 is another modification.

The form shown in Fig. 3 differs principally in that the regulating resistance 45 is located between the D. C. metallic electrode line and one of the A. C. carbon electrode lines. Here the circuits are not exactly balanced; and while this modification will work quite well, it has the disadvantage that the resistor 45 is working during idling as well as welding, while in the preferred forms of Fig. 1 or Fig. 2 the regulating resistors are only working during the welding.

It will be understood that the term "center-tap" as used herein is meant in the general sense commonly employed, that is, of an intermediate tap substantially balanced on both sides, but not necessarily precisely in the center.

While I have in the foregoing described certain specific embodiments by way of example, it will be understood that they are merely for purposes of illustration to make clear the principles of the invention, which is not limited to the particular forms shown, but is susceptible to various modifications and adaptations in different installations as will be apparent to those skilled in the art, without departing from the scope of the invention as stated in the following claims.

What is claimed is:

1. In a multi-arc electric welding apparatus, the combination of a pair of alternating current carbon electrodes, a direct current metallic welding rod forming a third electrode, a source of direct current for said third electrode, a regulatory resistance in circuit with said direct current third electrode, a ground connection for grounding to the work piece to be welded, a transformer supplying alternating current to the pair of carbon electrodes, said transformer having primary and secondary windings, an intermediate tap in said secondary dividing the secondary winding, said intermediate tap being grounded to said ground connection to the work piece, and the direct current circuit of the metallic third electrode being also grounded to said ground connection to the work piece, whereby a more balanced relation among the multiple arcs is facilitated.

2. In a multi-arc electric welding apparatus, the combination of a direct current metallic welding electrode, a pair of alternating current carbon electrodes, a direct current supply for said metallic electrode, an alternating current electrical transformer having a primary and a secondary, said secondary being connected to the carbon electrodes, a center tap on said secondary to which the direct current supply for said metallic electrode is connected, and an electrical connection from said center tap and metallic electrode adapted to be grounded to the work piece being welded, whereby a better balanced relation may be obtained between the multiple arcs.

3. In a multi-arc electric welding apparatus, the combination of a direct current metallic welding electrode, a pair of alternating current carbon electrodes, a direct current circuit for said metallic electrode, a regulatory resistance in series with said metallic electrode in the direct current circuit, an electrical connection in said direct current circuit adapted to be attached to the work piece being welded, an alternating current electrical transformer having a primary and a secondary, means for varying the output of said transformer, terminals on said secondary electrically connected in circuit with the carbon electrodes, an intermediate tap on the secondary of said transformer, said intermediate tap being electrically connected to the direct current circuit and to the work piece being welded at a common point, whereby the electrical energy may be more effectively distributed to the various arcs.

COLBY WESTON STEWARD.

No references cited.